(12) United States Patent
White et al.

(10) Patent No.: US 12,425,296 B2
(45) Date of Patent: Sep. 23, 2025

(54) PRO-ACTIVE TELECOMMUNICATIONS INFRASTRUCTURE DEPLOYMENT FAILURE DETECTION

(71) Applicant: Dell Products, L.P., Round Rock, TX (US)

(72) Inventors: Joseph White, San Jose, CA (US); Anusha Kandepu, Bangalore (IN); Maunish Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 18/424,276

(22) Filed: Jan. 26, 2024

(65) Prior Publication Data
US 2025/0247287 A1    Jul. 31, 2025

(51) Int. Cl.
*G06F 13/00* (2006.01)
*H04L 41/0806* (2022.01)
*H04L 41/0873* (2022.01)

(52) U.S. Cl.
CPC ...... *H04L 41/0806* (2013.01); *H04L 41/0873* (2013.01)

(58) Field of Classification Search
CPC .......................... H04L 41/0806; H04L 41/0873
USPC .................................................. 709/222, 201
See application file for complete search history.

(56) References Cited

U.S. PATENT DOCUMENTS

| | | | |
|---|---|---|---|
| 9,863,659 B2 * | 1/2018 | Palmer ..................... | H04W 4/80 |
| 9,958,178 B2 * | 5/2018 | Palmer ............... | H05K 7/20745 |
| 11,074,165 B2 * | 7/2021 | Khakare .............. | G06F 11/3684 |
| 11,088,944 B2 * | 8/2021 | Allen ...................... | H04L 45/24 |
| 11,099,976 B2 * | 8/2021 | Khakare ............... | G06F 3/0486 |
| 11,296,981 B2 * | 4/2022 | Allen ...................... | H04L 45/38 |
| 2011/0251937 A1 * | 10/2011 | Falk ........................ | G06F 21/10 705/34 |
| 2015/0253821 A1 * | 9/2015 | Palmer .................. | G06F 1/3296 361/679.31 |
| 2015/0256386 A1 * | 9/2015 | Palmer ..................... | F24F 11/62 709/220 |
| 2020/0278920 A1 * | 9/2020 | Khakare ................... | G06F 8/61 |
| 2020/0403905 A1 * | 12/2020 | Allen ..................... | H04L 45/742 |
| 2020/0403912 A1 * | 12/2020 | Allen ..................... | H04L 47/822 |

* cited by examiner

*Primary Examiner* — Kenneth R Coulter
(74) *Attorney, Agent, or Firm* — Amin, Turocy & Watson, LLP

(57) ABSTRACT

A system can determine inventory data representative of an inventory of hardware deployed in a telecommunications cloud deployment. The system can, after determining the inventory data, determine type data representative of a type of the telecommunications cloud deployment, and determine software stack data representative of a software stack of the telecommunications cloud deployment. The system can validate the telecommunications cloud deployment based on the type data representative of the type of the telecommunications cloud deployment and the software stack data representative of the software stack of the telecommunications cloud deployment. The system can, after validating the telecommunications cloud deployment, configure the hardware to produce configured hardware. The system can perform at least one telecommunications operation using the configured hardware.

20 Claims, 14 Drawing Sheets

PRO-ACTIVE TELECOMMUNICATIONS INFRASTRUCTURE DEPLOYMENT FAILURE DETECTION

BACKGROUND

Telecommunications services can be facilitated with hardware, and this hardware can be installed in a physical location as part of a deployment.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine inventory data representative of an inventory of hardware deployed in a telecommunications cloud deployment. The system can, after determining the inventory data, determine type data representative of a type of the telecommunications cloud deployment, and determine software stack data representative of a software stack of the telecommunications cloud deployment. The system can validate the telecommunications cloud deployment based on the type data representative of the type of the telecommunications cloud deployment and the software stack data representative of the software stack of the telecommunications cloud deployment. The system can, after validating the telecommunications cloud deployment, configure the hardware to produce configured hardware. The system can perform at least one telecommunications operation using the configured hardware.

An example method can comprise determining, by a system comprising a processor, an inventory of hardware deployed in a telecommunications cloud deployment. The method can further comprise, after determining the inventory, determining, by the system, a software stack of the telecommunications cloud deployment. The method can further comprise validating, by the system, the telecommunications cloud deployment based on the software stack of the telecommunications cloud deployment. The method can further comprise, after validating the telecommunications cloud deployment, configuring, by the system, the hardware, resulting in configured hardware. The method can further comprise performing, by the system, telecommunications operations with the configured hardware.

An example non-transitory computer-readable medium can comprise instructions that, in response to execution, cause a system comprising a processor to perform operations. These operations can comprise determining an inventory of hardware deployed in a telecommunications cloud deployment. These operations can further comprise, after determining the inventory, determining a group of computer-executable programs of the telecommunications cloud deployment that the telecommunications cloud deployment is configured to execute. These operations can further comprise validating the telecommunications cloud deployment based on the group of computer-executable programs of the telecommunications cloud deployment. These operations can further comprise, after validating the telecommunications cloud deployment, configuring the hardware to produce configured hardware. These operations can further comprise performing a telecommunications operation using the configured hardware.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Developments in cellular networking technologies (such as Fifth Generation (5G) cellular networks) present both opportunities and challenges. Network densification and complexity increases. A 5G network can involve a lot of densification, where resources from Fourth Generation (4G) or Long Term Evolution (LTE) networks are insufficient to handle 5G needs.

There can be an increased need for automation and manageability. Operators can desire automation and orchestration features to manage an extensive scale of distributed telecommunications provider cloud deployments.

A total cost of ownership can increase. With thousands, or tens of thousands, or nodes, integration, operations, and life cycle management (LCM) costs (e.g., costs related to upgrades, updates, scale-out, scale in, configuration management, etc.) can rise relative to prior networks.

A time to market can be important. An ability to deliver on scale, and to operate in an agile, flexible, and efficient manner can be important in reducing time to market for offerings.

As cloud service providers (CSPs) move from legacy telecommunications solutions to modern solutions based on cloud-native, open, and disaggregated architectures, these CSP can desire options that preserve choice while offering a reliable total-cost-of-ownership (TCO) efficient foundation to build upon.

The present techniques can be implemented to provide a multi-cloud foundation. An engineered system according to the present techniques can comprise a fully validated cloud platform (hardware (HW)/software (SW) stack) that is integrated from the factory (to reduce deployment time and risk), and automated for zero touch provisioning (ZT)/deployment and LCM.

Such a system can provide siloed automation (stack wise), hardware (infrastructure) automation, containers-as-a-service (CaaS) automation, an application stack, paper based solutions (white papers, reference architecture (RA), etc.), design guidelines, and configuration best practices.

Example Architectures and Workflows

Figure 1:
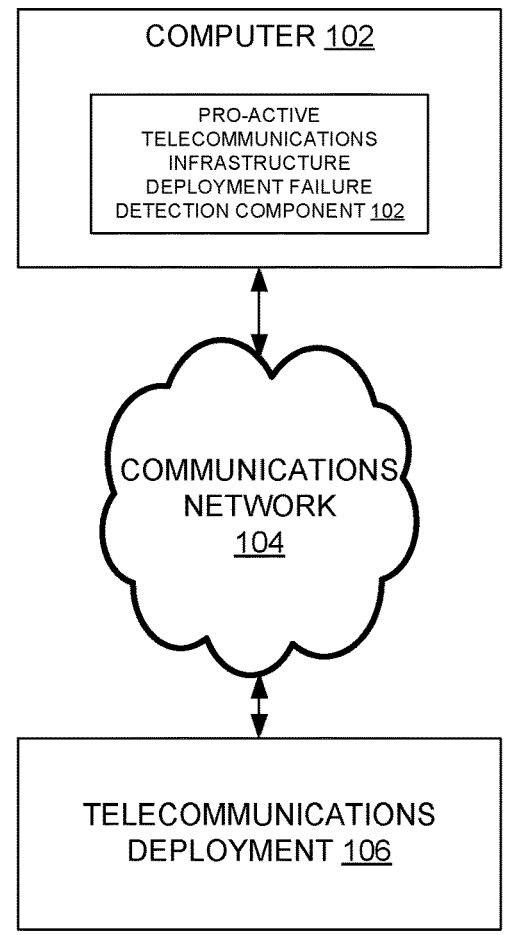
FIG. 1 illustrates an example system architecture that can facilitate pro-active telecommunications infrastructure deployment failure detection, in accordance with an embodiment of this disclosure.

FIG. 1 illustrates an example system architecture 100 that can facilitate pro-active telecommunications infrastructure deployment failure detection, in accordance with an embodiment of this disclosure.

System architecture 100 comprises computer 102, communications network 104, and telecommunications deployment 106. In turn, computer 102 comprises pro-active telecommunications infrastructure deployment failure detection component 108.

The present techniques can be implemented to facilitate a technology shift/transformation in telecom (e.g., from fourth-generation (4G) networks to fifth-generation (5G) networks). Such a shift/transformation can bring with it complexities for deployment and management of telecom networks, along with benefits from the network upgrade.

In previous approaches, telecom networks were build using purpose-built hardware running software (operating system and application software) from the same vendor. It can be that telecom networks can now be disaggregated, and various parts can come from different vendors. Given that, making these different parts work together as one network can be a challenge, which can be addressed with the present techniques.

System architecture 100 presents one logical example of implementing the present techniques, and it can be appreciated that there can be other examples, such as one where the operations of computer 102 are performed within telecommunications deployment 106.

Figure 14:
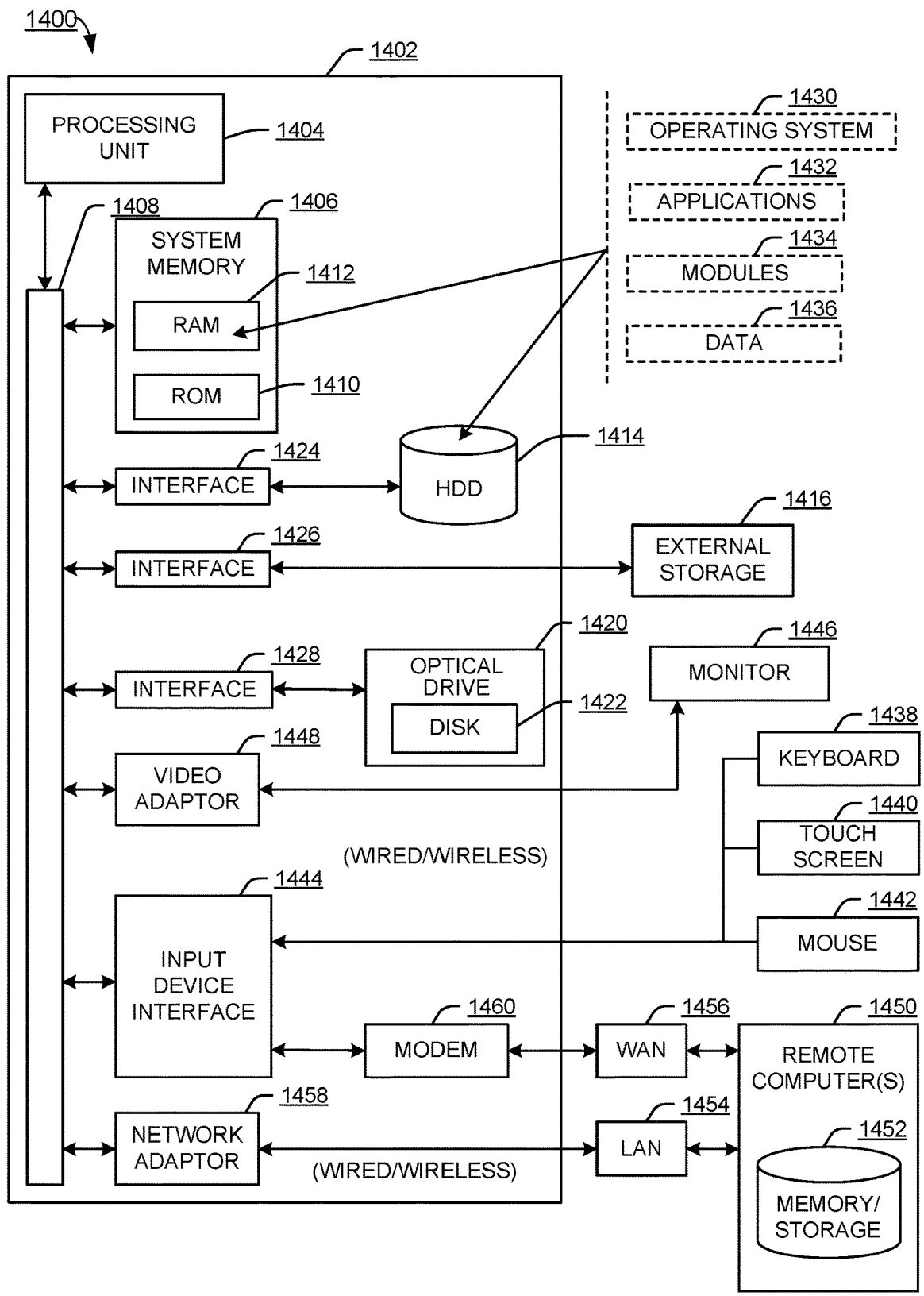
FIG. 14 illustrates an example block diagram of a computer operable to execute an embodiment of this disclosure.

Each of computer 102 and/or telecommunications deployment 106 can be implemented with part(s) of computing environment 1400 of FIG. 14. Communications network 104 can comprise a computer communications network, such as the Internet, or an intranet.

As part of deploying telecommunications deployment 106, pro-active telecommunications infrastructure deployment failure detection component 108 can analyze the deployment to identify a failure of the deployment (e.g., insufficient network addresses available for the deployment), and to facilitate pro-active telecommunications infrastructure deployment failure detection.

Figure 11:
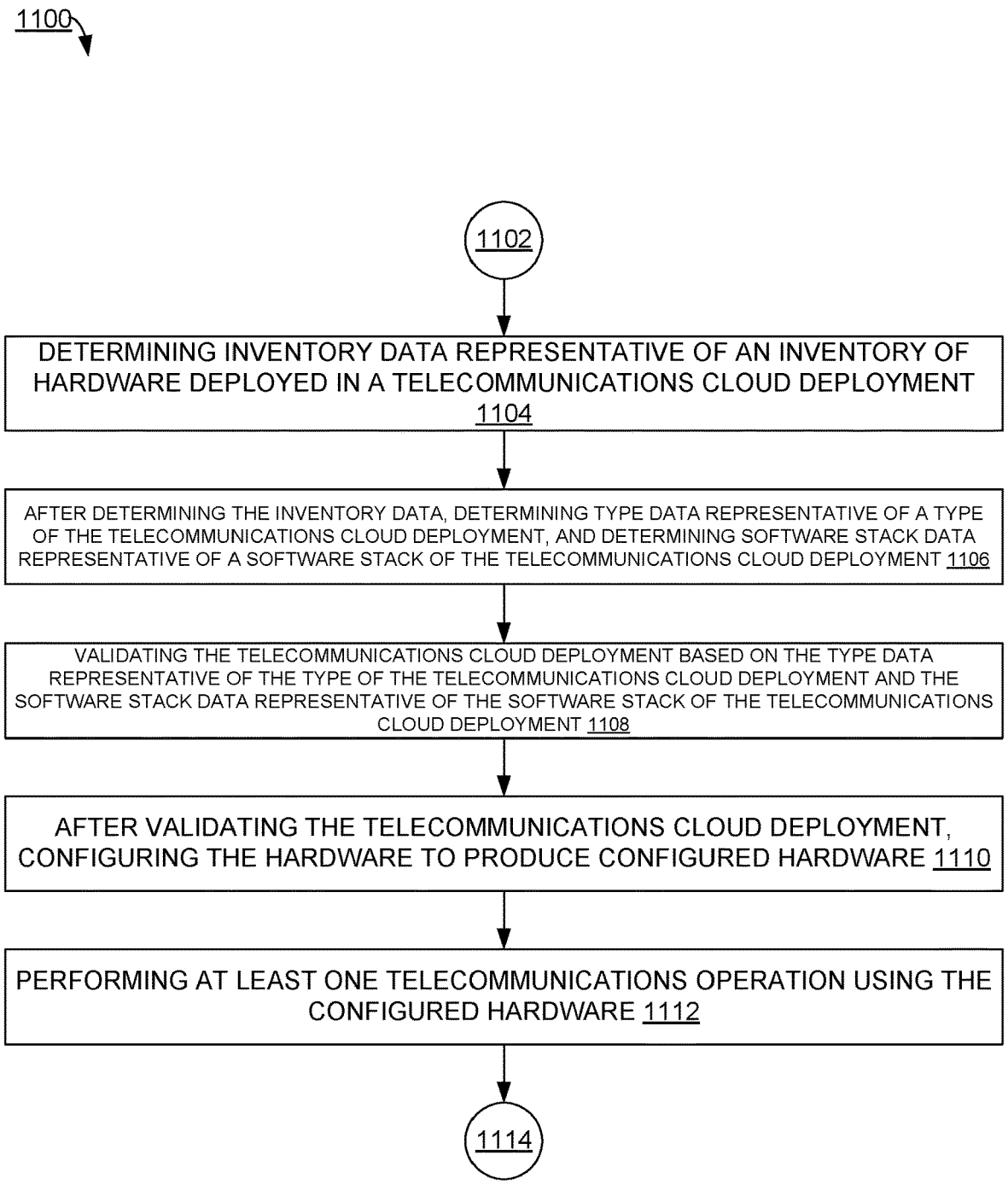
FIG. 11 illustrates an example process flow that can facilitate pro-active telecommunications infrastructure deployment failure detection, in accordance with an embodiment of this disclosure.
Figure 12:
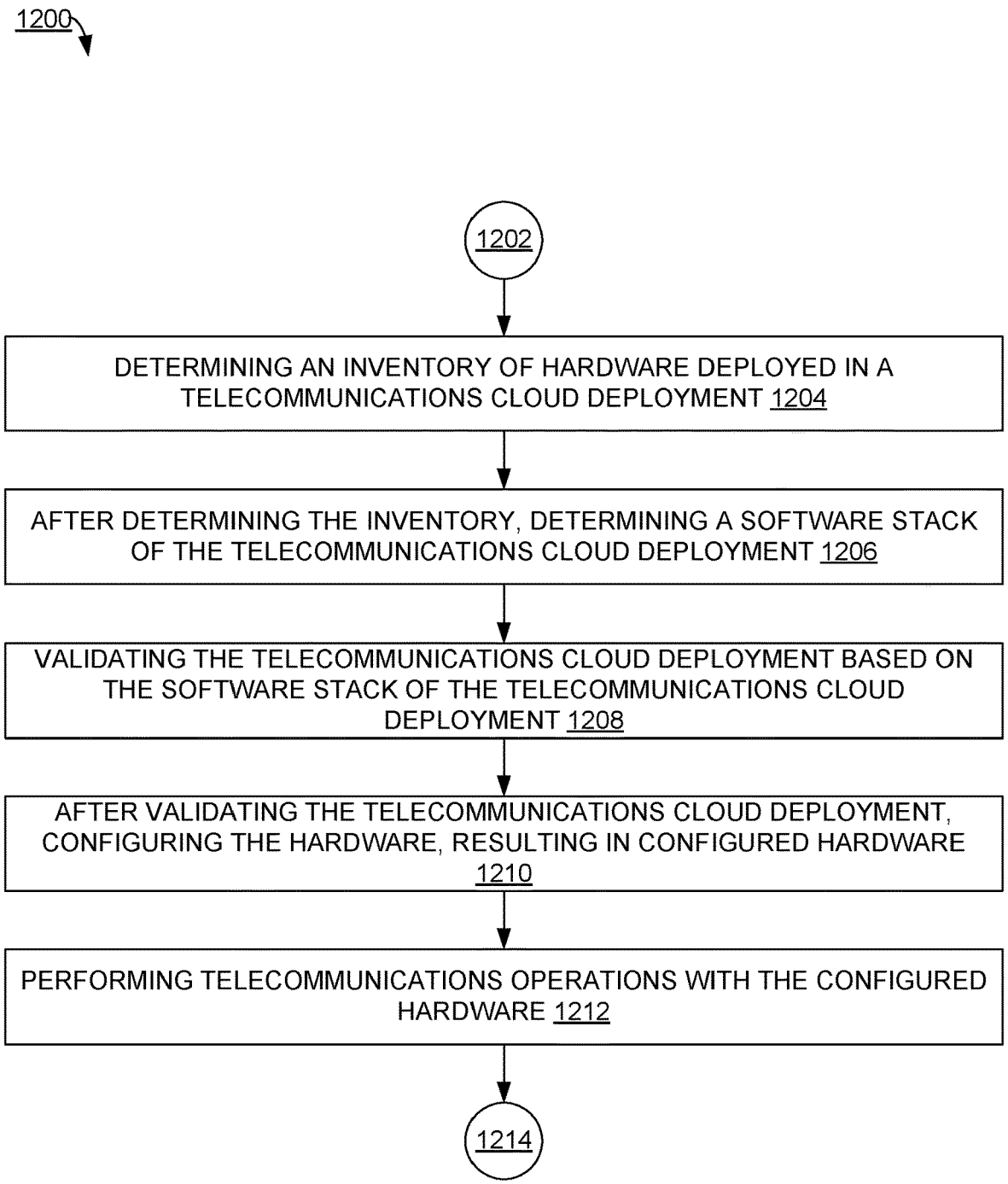
FIG. 12 illustrates another example process flow that can facilitate pro-active telecommunications infrastructure deployment failure detection, in accordance with an embodiment of this disclosure.
Figure 13:
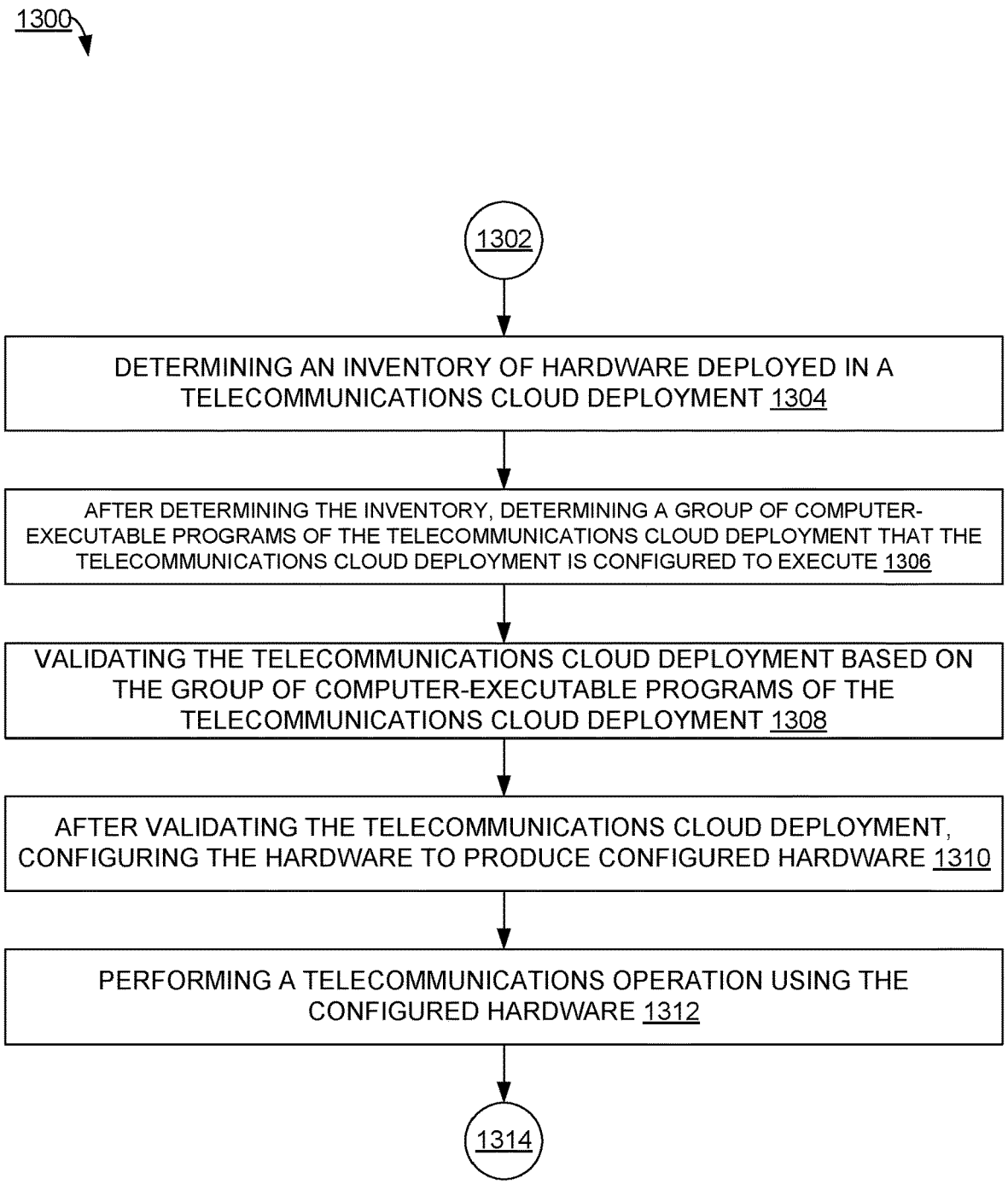
FIG. 13 illustrates another example process flow that can facilitate pro-active telecommunications infrastructure deployment failure detection, in accordance with an embodiment of this disclosure.

In some examples, pro-active telecommunications infrastructure deployment failure detection component 108 can implement part(s) of the process flows of FIGS. 11-13 to implement pro-active telecommunications infrastructure deployment failure detection.

It can be appreciated that system architecture 100 is one example system architecture for pro-active telecommunications infrastructure deployment failure detection, and that there can be other system architectures that facilitate pro-active telecommunications infrastructure deployment failure detection.

Figure 2:
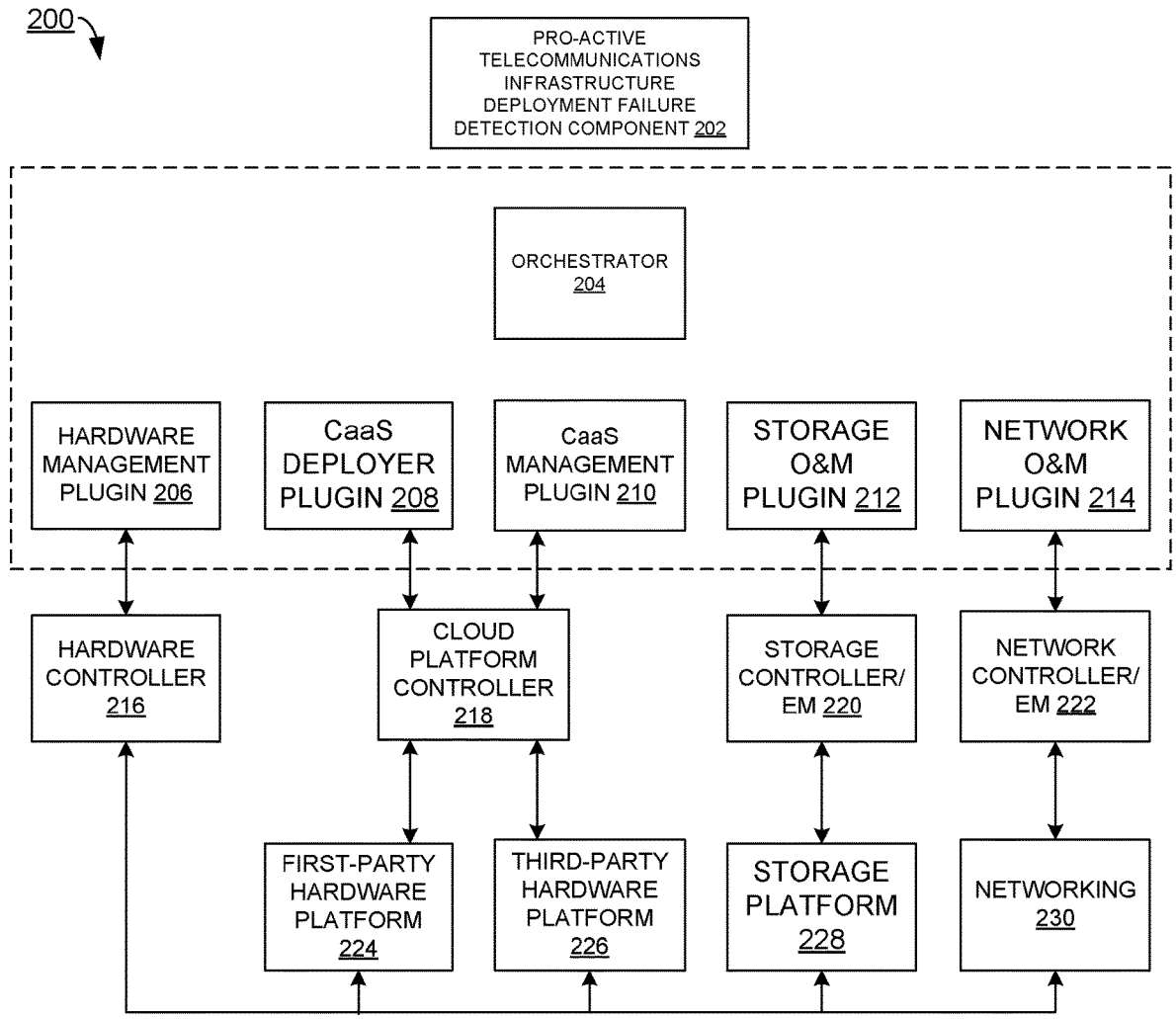
FIG. 2 illustrates an example cloud control plane architecture that can facilitate pro-active telecommunications infrastructure deployment failure detection, in accordance with an embodiment of this disclosure.

FIG. 2 illustrates an example cloud control plane architecture 200 that can facilitate pro-active telecommunications infrastructure deployment failure detection, in accordance with an embodiment of this disclosure. In some examples, part(s) of FIG. 2 can be used to implement part(s) of system architecture 100 of FIG. 1.

An architecture for a telecommunications cloud infrastructure control plane according to the present techniques can be implemented as follows. This can comprise an example architecture of a cloud control plane for deploying and managing a distributed telecommunications cloud (including a hardware stack and a software stack).

Cloud control plane architecture 200 comprises pro-active telecommunications infrastructure deployment failure detection component 202, orchestrator 204, hardware management plugin 206, cloud-as-a-service (CaaS) deployer plugin 208, CaaS management plugin 210, storage operation and maintenance (O&M) plugin 212, network O&M plugin 214, hardware controller 216, cloud platform controller 218, storage controller/enterprise manager (EM) 220, network controller/EM 222, first-party hardware platform 224, third-party hardware platform 226, storage platform 228, and networking 230.

Figure 3:
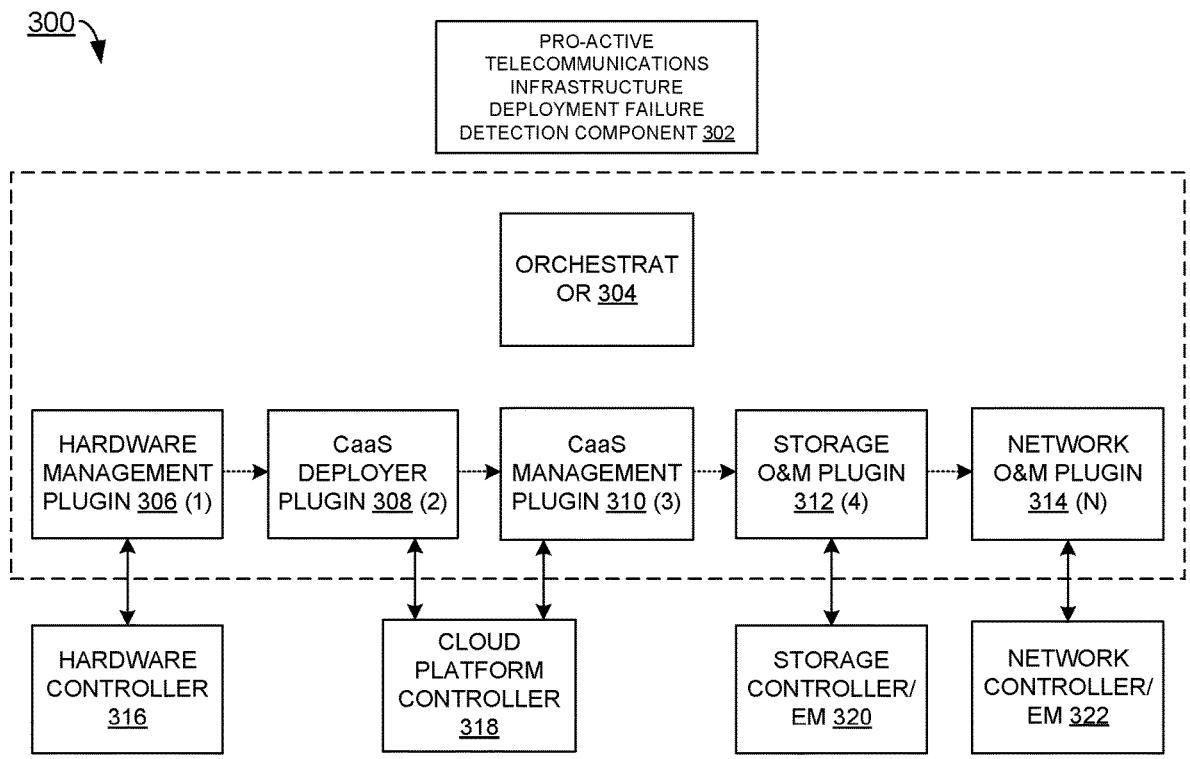
FIG. 3 illustrates an example cloud control plane workflow that can facilitate pro-active telecommunications infrastructure deployment failure detection, in accordance with an embodiment of this disclosure.

FIG. 3 illustrates an example cloud control plane workflow 300 that can facilitate pro-active telecommunications infrastructure deployment failure detection, in accordance with an embodiment of this disclosure. In some examples, part(s) of FIG. 3 can be used to implement part(s) of system architecture 100 of FIG. 1.

An example cloud control plane workflow managing telecommunications cloud infrastructure can be implemented as follows. This example provides a view into a step-by-step process of cloud control plane workflows for deploying and managing a distributed telecommunications cloud (including a hardware stack and a software stack).

Cloud control plane workflow 300 comprises pro-active telecommunications infrastructure deployment failure detection component 302, orchestrator 304, hardware management plugin 306, CaaS deployer plugin 308, CaaS management plugin 310, storage O&M plugin 312, network O&M plugin 314, hardware controller 316, cloud platform controller 318, storage controller/EM 320, and network controller/EM 322. These parts of FIG. 3 can be similar to pro-active telecommunications infrastructure deployment failure detection component 202, orchestrator 204, hardware management plugin 206, CaaS deployer plugin 208, CaaS management plugin 210, storage O&M plugin 212, network O&M plugin 214, hardware controller 216, cloud platform controller 218, storage controller/EM 220, and network controller/EM 222 of FIG. 2, respectively.

Problems with prior approaches can be as follows. It can be that various cloud control plane solutions from different vendors and system integrators (Sis) have helped address some of the challenges of CSPs. However, it can be that, due to a serialized automation approach for deploying and managing telecommunications cloud infrastructure (including a hardware stack and a software stack), a problem of "late detection of deployment and/or LCM failures" can exist.

A cause of this problem can be incorrect or inadequate inputs, and/or a lack of resources. An impact of this problem can be an extended maintenance window and longer service outages, and/or higher operating expenditures (OpEx) and/or TCO.

Figure 4:
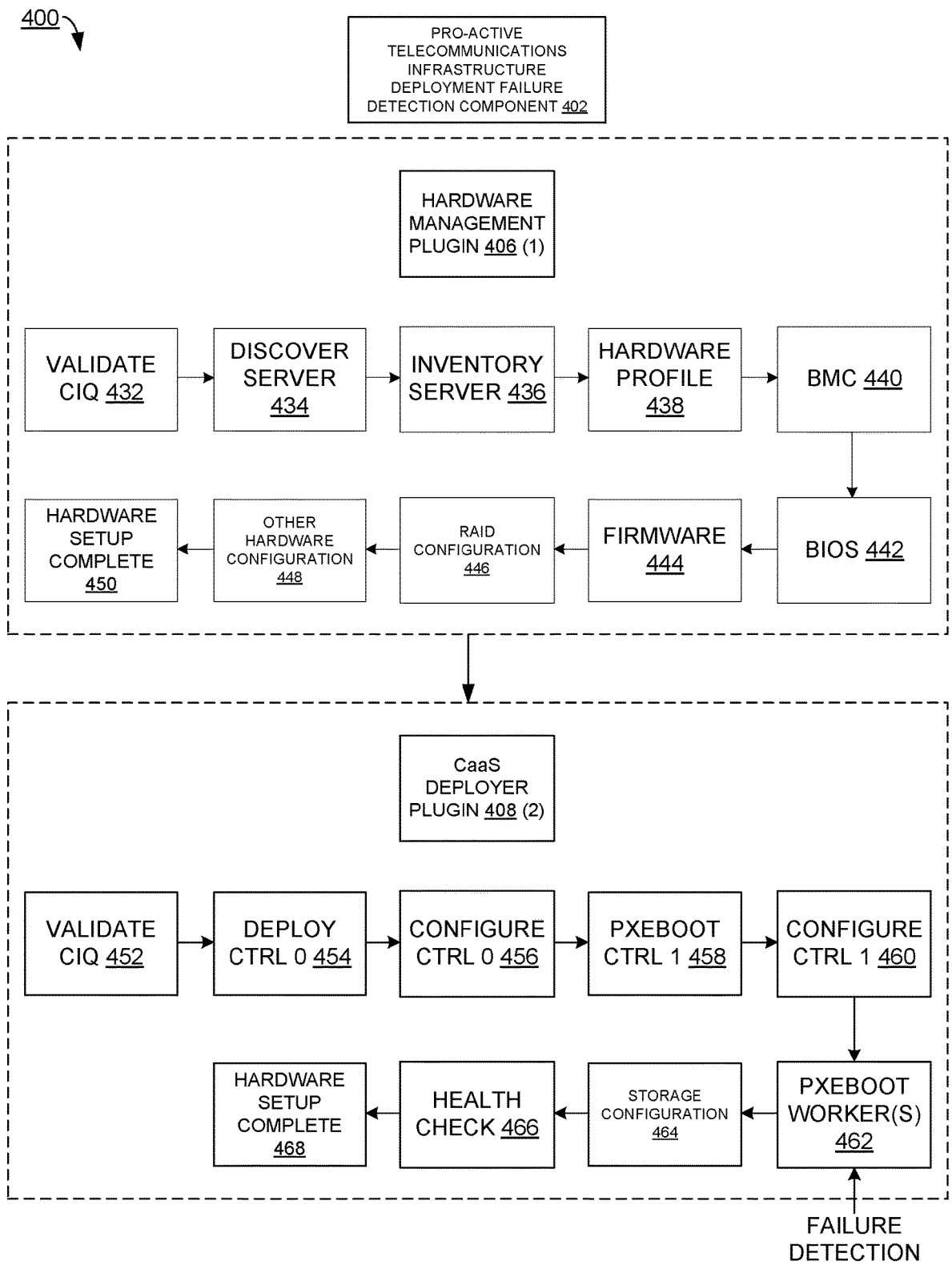
FIG. 4 illustrates another example cloud control plane architecture that can facilitate pro-active telecommunications infrastructure deployment failure detection, in accordance with an embodiment of this disclosure.

FIG. 4 illustrates another example cloud control plane architecture 400 that can facilitate pro-active telecommunications infrastructure deployment failure detection, in accordance with an embodiment of this disclosure. In some examples, part(s) of FIG. 4 can be used to implement part(s) of system architecture 100 of FIG. 1.

An example of failure detection can relate to insufficient network addresses (e.g., Internet Protocol (IP) addresses). This example can illustrate a workflow for deploying a distributed telecommunications cloud where hardware is setup first using a hardware management plugin, followed by a CaaS platform. This example can also highlight how many steps/operations into the process the deployment failure is detected, due to an insufficient number of IP addresses supplied in the customer information questionnaire (CIQ) file, which can generally specify characteristics that the telecommunications deployment is to have.

A similar issue can be applicable to a "Day 2" operation of managing a distributed telecommunications cloud, for instance, when scaling a cluster.

Cloud control plane architecture 400 comprises pro-active telecommunications infrastructure deployment failure detection component 402, hardware management plugin 406, and CaaS deployer plugin 408. These parts of FIG. 4 can be similar to pro-active telecommunications infrastructure deployment failure detection component 302, hardware management plugin 306, and CaaS deployer plugin 308 of FIG. 3.

In turn, hardware management plugin 406 comprises validate CIQ 432, discover server 434, inventory server 436, hardware profile 438, BMC 440, BIOS 442, firmware 444, RAID configuration 446, other hardware configuration 448, and hardware setup complete 450. And, CaaS deployer plugin 408 comprises validate CIQ 452, deploy Ctrl 0 454, configure Ctrl 0 456, PXEBOOT Ctrl 1 458, configure Ctrl 1 460, PXEBOOT worker(s) 462, storage configuration 464, health check 466, and hardware setup complete 468.

Figure 5:
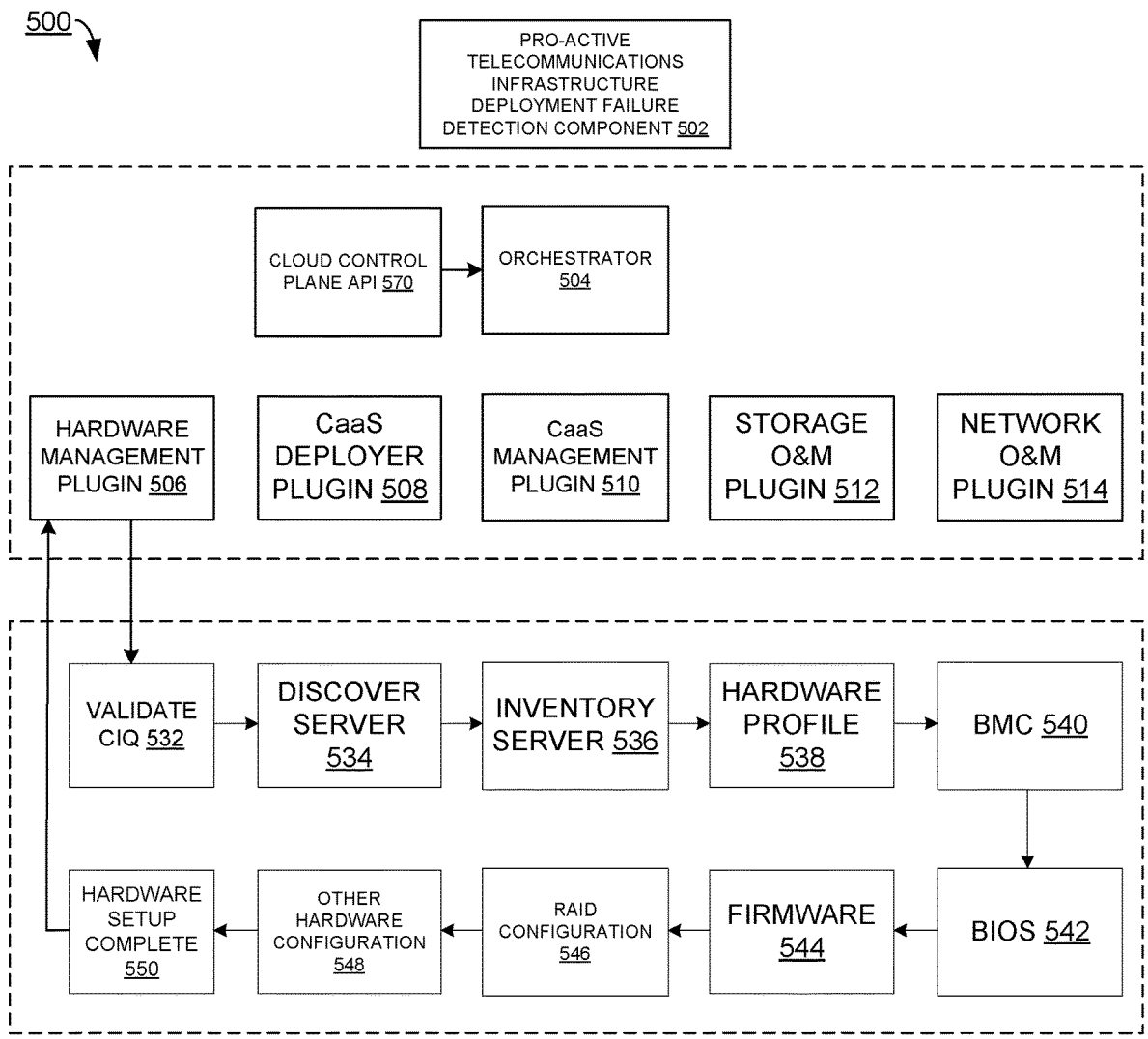
FIG. 5 illustrates another example cloud control plane architecture that can facilitate pro-active telecommunications infrastructure deployment failure detection, in accordance with an embodiment of this disclosure.

FIG. 5 illustrates another example cloud control plane architecture 500 that can facilitate pro-active telecommunications infrastructure deployment failure detection, in accordance with an embodiment of this disclosure. In some examples, part(s) of FIG. 5 can be used to implement part(s) of system architecture 100 of FIG. 1.

This can give an example hardware management workflow. Illustrated are various operations that can be part of hardware setup before installing a CaaS platform on server nodes as part of a distributed telecommunications cloud deployment process.

Cloud control plane architecture 500 comprises pro-active telecommunications infrastructure deployment failure detection component 502, orchestrator 504, hardware management plugin 506, CaaS deployer plugin 508, CaaS management plugin 510, storage O&M plugin 512, and network O&M plugin 514. These parts of cloud control plane architecture 500 can be similar to pro-active telecommunications infrastructure deployment failure detection component 202, orchestrator 204, hardware management plugin 206, CaaS deployer plugin 208, CaaS management plugin 210, storage O&M plugin 212, and network O&M plugin 214 of FIG. 2, respectively.

Cloud control plane architecture 500 also comprises validate CIQ 532, discover server 534, inventory server 536, hardware profile 538, BMC 540, BIOS 542, firmware 544, RAID configuration 546, other hardware configuration 548, and hardware setup complete 550. These parts of cloud control plane architecture 500 can be similar to comprises validate CIQ 432, discover server 434, inventory server 436, hardware profile 438, BMC 440, BIOS 442, firmware 444, RAID configuration 446, other hardware configuration 448, and hardware setup complete 450 of FIG. 4, respectively.

Cloud control plane architecture 500 also comprises cloud control plane application programming interface (API) 570.

Figure 6:
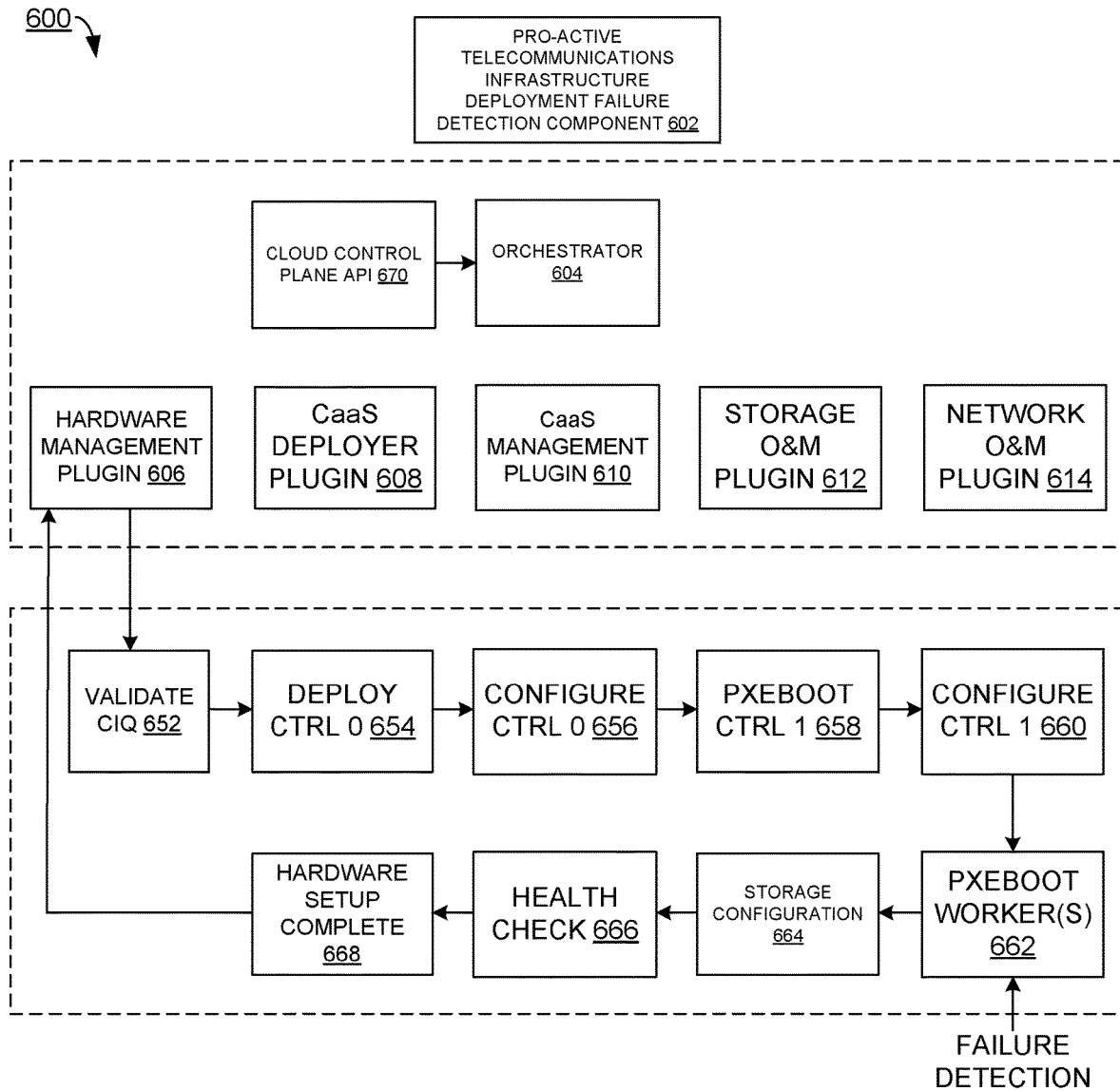
FIG. 6 illustrates an example cloud-as-a-service deployment workflow that can facilitate pro-active telecommunications infrastructure deployment failure detection, in accordance with an embodiment of this disclosure.

FIG. 6 illustrates an example cloud-as-a-service deployment workflow 600 that can facilitate pro-active telecommunications infrastructure deployment failure detection, in accordance with an embodiment of this disclosure. In some examples, part(s) of FIG. 6 can be used to implement part(s) of system architecture 100 of FIG. 1.

This can give an example CaaS deployment workflow. Illustrated are various operations that can be part of CaaS deployment, including an operation where deployment failure can be detected in deploying a distributed telecommunications deployment.

CaaS deployment workflow 600 comprises pro-active telecommunications infrastructure deployment failure detection component 602, orchestrator 604, hardware management plugin 606, CaaS deployer plugin 608, CaaS management plugin 610, storage O&M plugin 612, and network O&M plugin 614. These parts of CaaS deployment workflow 600 can be similar to pro-active telecommunications infrastructure deployment failure detection component 202, orchestrator 204, hardware management plugin 206, CaaS deployer plugin 208, CaaS management plugin 210, storage O&M plugin 212, and network O&M plugin 214 of FIG. 2, respectively.

CaaS deployment workflow 600 also comprises validate CIQ 652, deploy Ctrl 0 654, configure Ctrl 0 656, PXEBOOT Ctrl 1 658, configure Ctrl 1 660, PXEBOOT worker(s) 662, storage configuration 664, health check 666, and hardware setup complete 668. These parts of CaaS deployment workflow 600 can be similar to validate CIQ 452, deploy Ctrl 0 454, configure Ctrl 0 456, PXEBOOT Ctrl 1 458, configure Ctrl 1 460, PXEBOOT worker(s) 462, storage configuration 464, health check 466, and hardware setup complete 468 of FIG. 4, respectively.

CaaS deployment workflow 600 also comprises cloud control plane API 670, which can be similar to cloud control plane API 570 of FIG. 5.

As highlighted in FIGS. 5-6, detection of insufficient/inadequate resources and/or a resource binding process can occur relatively late during deployment of a telecommunications cloud, or Day 2 operations, in some approaches. This can result in a longer maintenance window for CSP and higher OpEx/TCP. It can be beneficial for CSPs where issues are uncovered earlier during a deployment process so that a user can take prompt action. This can be helpful where a CSP is re-integrating what is disaggregated as part of taking advantage of fifth generation (5G) and Open Radio Access Network (Open RAN) technologies).

Figure 7:
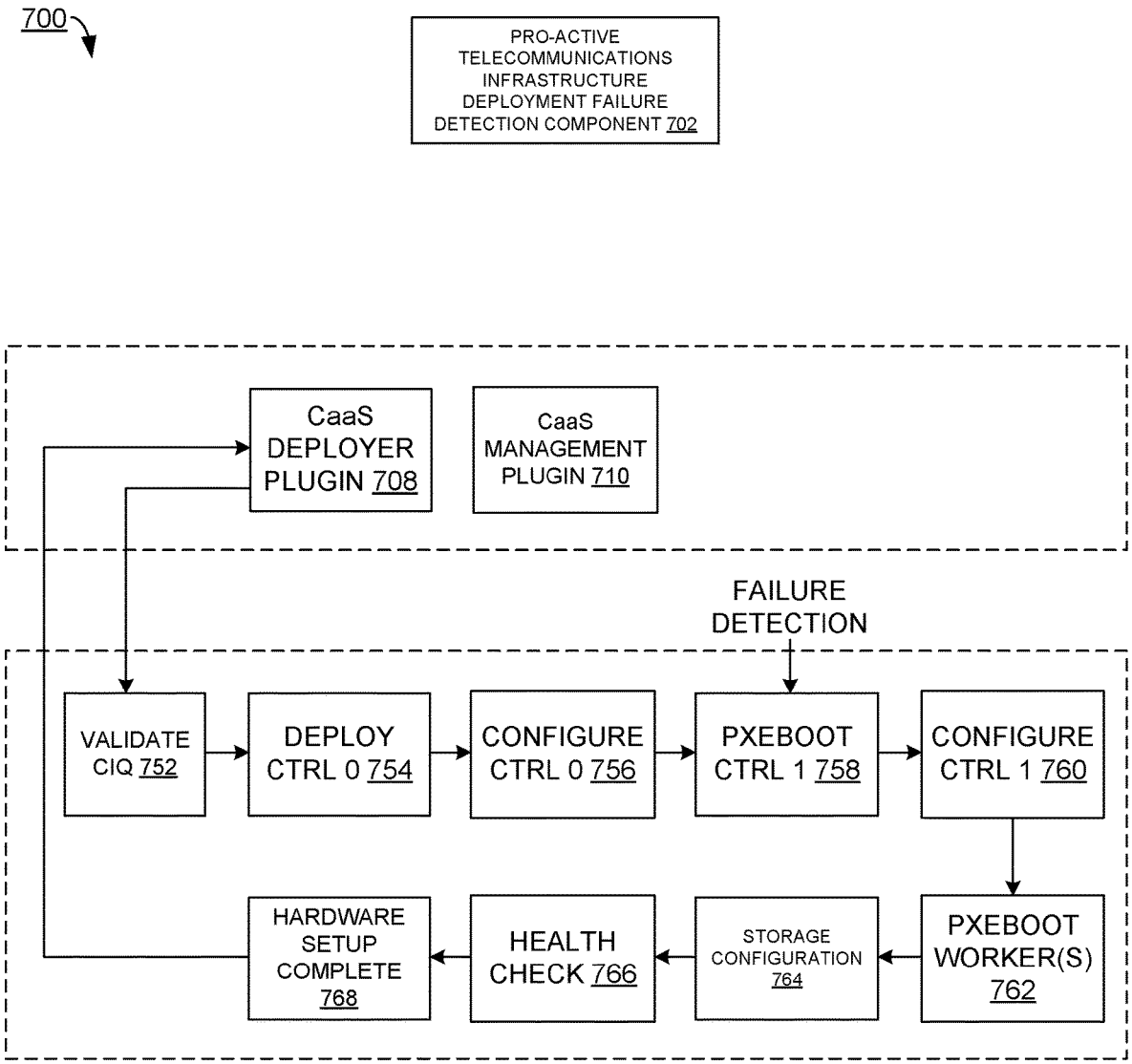
FIG. 7 illustrates an example late failure detection architecture that can facilitate pro-active telecommunications infrastructure deployment failure detection, in accordance with an embodiment of this disclosure.

FIG. 7 illustrates an example late failure detection architecture 700 that can facilitate pro-active telecommunications infrastructure deployment failure detection, in accordance with an embodiment of this disclosure. In some examples, part(s) of FIG. 7 can be used to implement part(s) of system architecture 100 of FIG. 1.

This example can illustrate a failure detection due to an incorrect IP address range within a specified subnet.

Late failure detection architecture 700 comprises pro-active telecommunications infrastructure deployment failure detection component 702, CaaS deployer plugin 708, and CaaS management plugin 710. These parts of late failure detection architecture 700 can be similar to pro-active telecommunications infrastructure deployment failure detection component 202, CaaS deployer plugin 208, and CaaS management plugin 210 of FIG. 2, respectively.

Late failure detection architecture 700 also comprises validate CIQ 752, deploy controller 0 (Ctrl 0, which can be a control plane node and act as active-passive; in care of a failure of an active Ctrl 1, a passive Ctrl 0 can become active) 754, configure Ctrl 0 756, network booting (PXEBOOT) Ctrl 1 758, configure Ctrl 1 760, PXEBOOT worker(s) 762, storage configuration 764, health check 766, and hardware setup complete 768. These parts of late failure detection architecture 700 can be similar to validate CIQ 452, deploy Ctrl 0 454, configure Ctrl 0 456, PXEBOOT Ctrl 1 458, configure Ctrl 1 460, PXEBOOT worker(s) 462, storage configuration 464, health check 466, and hardware setup complete 468 of FIG. 4, respectively.

Figure 8:
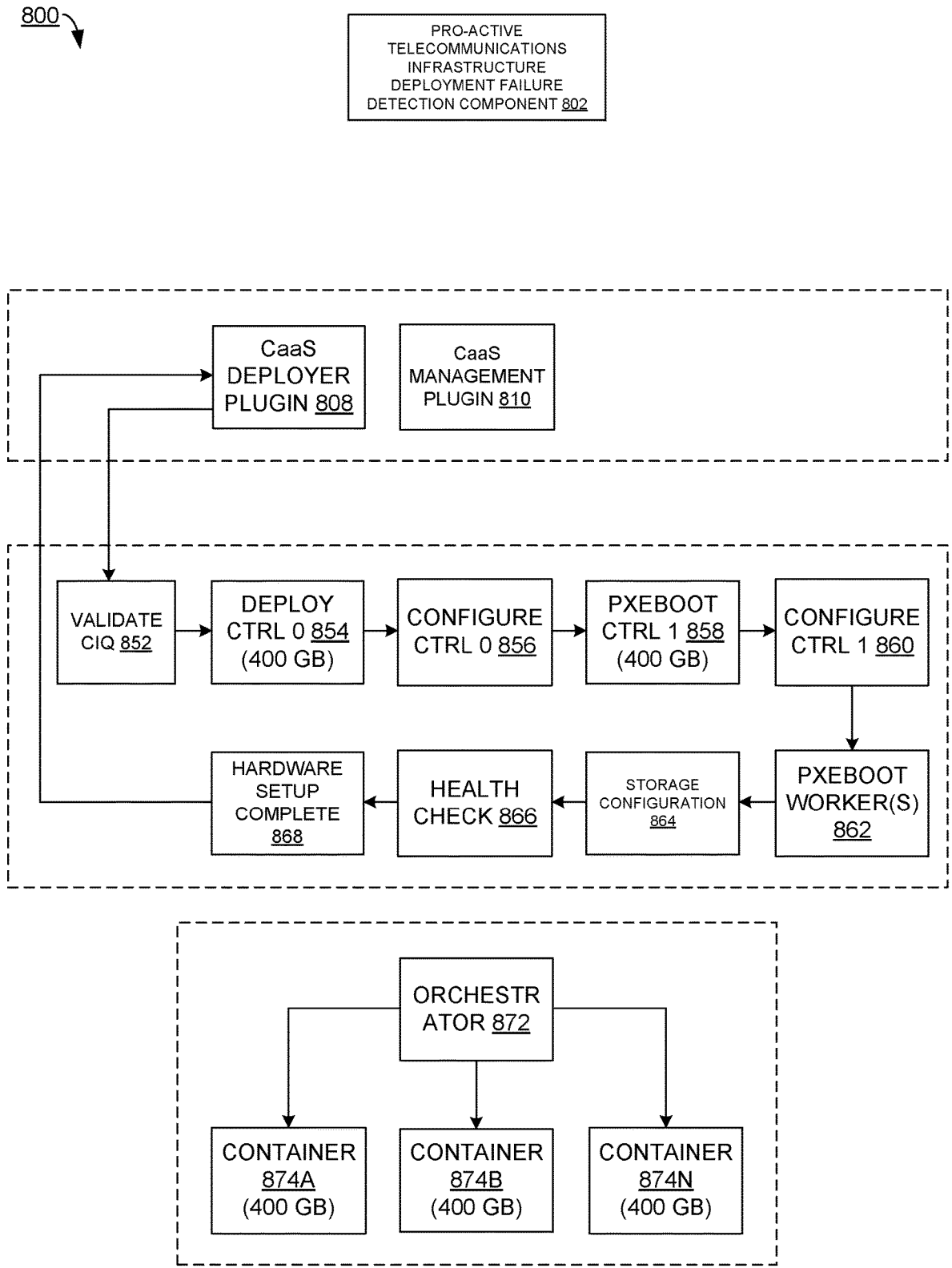
FIG. 8 illustrates another example late failure detection architecture that can facilitate pro-active telecommunications infrastructure deployment failure detection, in accordance with an embodiment of this disclosure.

FIG. 8 illustrates another example late failure detection architecture 800 that can facilitate pro-active telecommunications infrastructure deployment failure detection, in accordance with an embodiment of this disclosure. In some examples, part(s) of FIG. 8 can be used to implement part(s) of system architecture 100 of FIG. 1.

This example can illustrate a failure detection due to insufficient disk capacity (e.g., where the disk space requirement is 500 gigabytes (GB)).

Late failure detection architecture 800 comprises orchestrator 872, container 874A, container 874B, and container 874N.

Late failure detection architecture 800 also comprises pro-active telecommunications infrastructure deployment failure detection component 802, CaaS deployer plugin 808, CaaS management plugin 810, validate CIQ 852, deploy Ctrl 0 854, configure Ctrl 0 856, PXEBOOT Ctrl 1 858, configure Ctrl 1 860, PXEBOOT worker(s) 862, storage configuration 864, health check 866, and hardware setup complete 868. These parts of late failure detection architecture 800 can be similar to pro-active telecommunications infrastructure deployment failure detection component 702, CaaS deployer plugin 708, CaaS management plugin 710, validate CIQ 752, deploy Ctrl 0 754, configure Ctrl 0 756, PXEBOOT Ctrl 1 758, configure Ctrl 1 760, PXEBOOT worker(s) 762, storage configuration 764, health check 766, and hardware setup complete 768 of FIG. 7, respectively.

Figure 9:
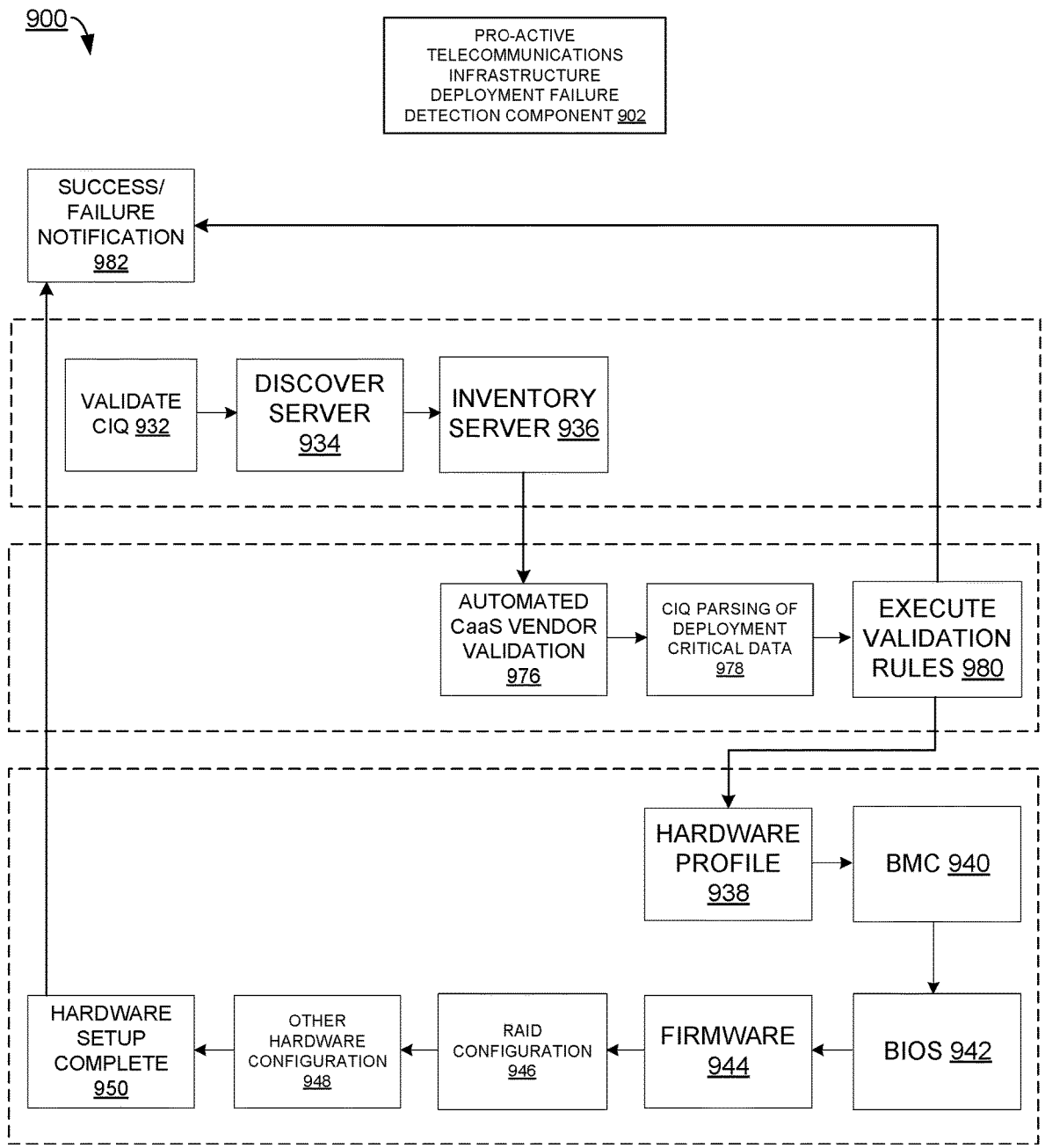
FIG. 9 illustrates an example workflow that can facilitate pro-active telecommunications infrastructure deployment failure detection, in accordance with an embodiment of this disclosure.

FIG. 9 illustrates an example workflow 900 that can facilitate pro-active telecommunications infrastructure deployment failure detection, in accordance with an embodiment of this disclosure. In some examples, part(s) of FIG. 9 can be used to implement part(s) of system architecture 100 of FIG. 1.

The present techniques can be implemented to mitigate against a problem of late deployment failure detection for CSPs. According to the present techniques, and in some examples, once a hardware inventory is completed as part of a hardware management workflow, a type of telecommunications deployment and software stack can be automatically detected. Automatic detection can be performed by reading input files uploaded by a user account to a centralized file server/repository/etc. Once an operating system vendor is identified, the present techniques can be implemented to parse critical deployment data from the set of input files and validate them against the pre-defined rules.

Once the software stack is identified, the present techniques can be implemented to query (from the input files uploaded by the user account) the deployment critical data applicable to the cloud platform provider to validate the data to make sure that correct and adequate data, information, and resources are available for the deployment.

The following are some examples of deployment critical data:
A number of IP addresses available for a deployment type (single node, dual node, multi-node);
A listing of a valid IP address range and subnet;
A disk size for a containerized application;
A disk size for a containerized application and a certain workload; and
A number of virtual local area networks (VLANs).

The present techniques can be implemented to have the intelligence built in to analyze, compare, and validate deployment-critical parameters for a software stack within a hardware management workflow such that certain deployment and Day 2 operation-type failures can be detected early, which can allow users/CSPs to take prompt action when a failure is detected.

As illustrated, once a hardware inventory step is completed, the present techniques can be implemented to validate an accuracy and sufficiency of data and resources before proceeding to a next step of hardware configuration and firmware updates. This approach can facilitate users/CSPs in detecting potential deployment failures due to user input errors early enough to meet a maintenance time window requirement.

That is, implementations of the present techniques can involve implementing CaaS vendor validation 976, CIQ, parsing of deployment critical data 978, and execute validation rules 980 after inventory server 936 and before hardware profile 938. It can be that implementing 976, 878, and 980 at this point can facilitate using a combination of inventory and other inputs to determine whether a deployment will fail. Compared to implementing 976, 878, and 980 after other hardware configuration 948 (for example), this can save time and resources.

That is, a deployment failure can be identified sooner, and without costs associated with people working on the deployment for longer, or a deployment being down.

Workflow 900 comprises validate CIQ 932, discover server 934, inventory server 936, hardware profile 938, BMC 940, BIOS 942, firmware 944, RAID configuration 946, other hardware configuration 948, and hardware setup complete 950. These parts of workflow 900 can be similar to validate CIQ 432, discover server 434, inventory server 436, hardware profile 438, BMC 440, BIOS 442, firmware 444, RAID configuration 446, other hardware configuration 448, and hardware setup complete 450 of FIG. 4, respectively.

Workflow 900 also comprises automated CaaS vendor validation 976, CIQ, parsing of deployment critical data 978, execute validation rules 980, and success/failure notification 982.

Figure 10:
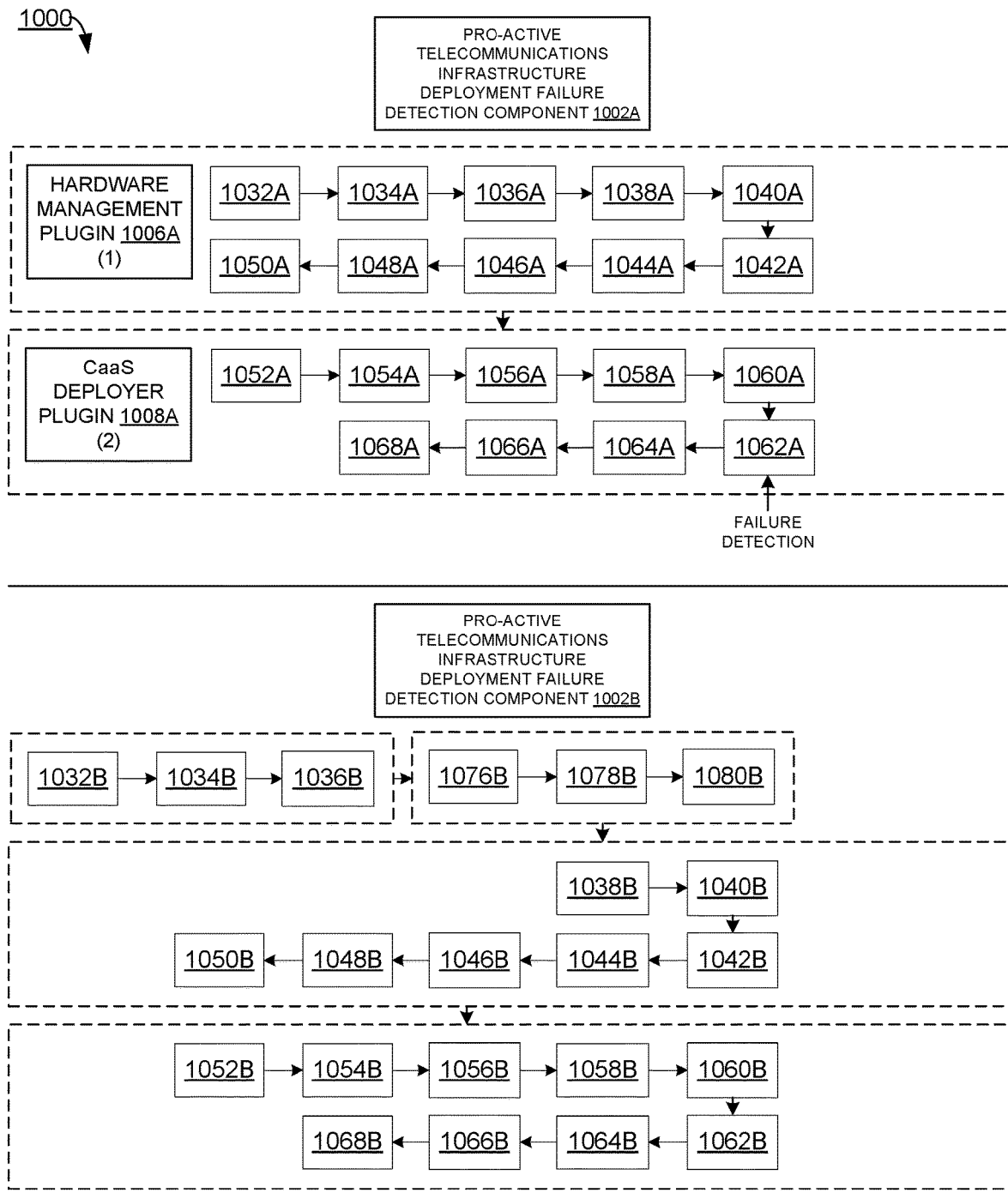
FIG. 10 illustrates another example workflow that can facilitate pro-active telecommunications infrastructure deployment failure detection, in accordance with an embodiment of this disclosure.

FIG. 10 illustrates another example workflow 1000 that can facilitate pro-active telecommunications infrastructure deployment failure detection, in accordance with an embodiment of this disclosure. In some examples, part(s) of FIG. 10 can be used to implement part(s) of system architecture 100 of FIG. 1.

This example compares an approach according to prior techniques (the parts of the figure labeled "A") with an approach according to the present techniques (the parts of the figure labeled "B").

Workflow 1000 comprises pro-active telecommunications infrastructure deployment failure detection component 1002A, hardware management plugin 1006A, and CaaS deployer plugin 1008A. In turn, hardware management plugin 1006A comprises validate CIQ 1032A, discover server 1034A, inventory server 1036A, hardware profile 1038A, BMC 1040A, BIOS 1042A, firmware 1044A, RAID configuration 1046A, other hardware configuration 1048A, and hardware setup complete 1050A. And, CaaS deployer plugin 1008A comprises validate CIQ 1052A, deploy Ctrl 0 1054A, configure Ctrl 0 1056A, PXEBOOT Ctrl 1 1058A, configure Ctrl 1 1060A, PXEBOOT worker(s) 1062A, storage configuration 1064A, health check 1066A, and hardware setup complete 1068A.

These parts of workflow 1000 can be similar to pro-active telecommunications infrastructure deployment failure detection component 402, hardware management plugin 406, and CaaS deployer plugin 408, validate CIQ 432, discover server 434, inventory server 436, hardware profile 438, BMC 440, BIOS 442, firmware 444, RAID configuration 446, other hardware configuration 448, hardware setup complete 450 validate CIQ 452, deploy Ctrl 0 454, configure Ctrl 0 456, PXEBOOT Ctrl 1 458, configure Ctrl 1 460, PXEBOOT worker(s) 462, storage configuration 464, health check 466, and hardware setup complete 468 of FIG. 4, respectively.

Workflow 1000 also comprises pro-active telecommunications infrastructure deployment failure detection component 1002B, CIQ 1032B, discover server 1034B, inventory server 1036B, automated CaaS vendor validation 1076B, CIQ parsing of deployment critical data 1078B, execute validation rules 1080B, hardware profile 1038B, BMC 1040B, BIOS 1042B, firmware 1044B, RAID configuration 1046B, other hardware configuration 1048B, hardware setup complete 1050B, validate CIQ 1052B, deploy Ctrl 0 1054B, configure Ctrl 0 1056B, PXEBOOT Ctrl 1 1058B, configure Ctrl 1 1060B, PXEBOOT worker(s) 1062B, storage configuration 1064B, health check 1066B, and hardware setup complete 1068B.

These parts of workflow 1000 can be similar to pro-active telecommunications infrastructure deployment failure detection component 402, validate CIQ 432, discover server 434, inventory server 436, hardware profile 438, BMC 440, BIOS 442, firmware 444, RAID configuration 446, other hardware configuration 448, hardware setup complete 450, automated CaaS vendor validation 976, CIQ parsing of deployment critical data 978, execute validation rules 980, validate CIQ 452, deploy Ctrl 0 454, configure Ctrl 0 456, PXEBOOT Ctrl 1 458, configure Ctrl 1 460, PXEBOOT worker(s) 462, storage configuration 464, health check 466, and hardware setup complete 468, respectively.

Example Process Flows

FIG. 11 illustrates an example process flow 1100 that can facilitate pro-active telecommunications infrastructure deployment failure detection, in accordance with an embodiment of this disclosure. In some examples, one or more embodiments of process flow 1100 can be implemented by pro-active telecommunications infrastructure deployment failure detection component 108 of FIG. 1, or computing environment 1400 of FIG. 141.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1200 of FIG. 12, and/or process flow 1300 of FIG. 13.

Process flow 1100 begins with 1102, and moves to operation 1104.

Operation 1104 depicts determining inventory data representative of an inventory of hardware deployed in a telecommunications cloud deployment. In some examples, this can be performed in a similar manner as described with respect to discover server 1004 and inventory server 1006 of FIG. 10.

After operation 1104, process flow 1100 moves to operation 1106.

Operation 1106 depicts, after determining the inventory data, determining type data representative of a type of the telecommunications cloud deployment, and determining software stack data representative of a software stack of the telecommunications cloud deployment. In some examples, this can be performed in a similar manner as CaaS identification 1008 of FIG. 10.

After operation 1106, process flow 1100 moves to operation 1108.

Operation 1108 depicts validating the telecommunications cloud deployment based on the type data representative of the type of the telecommunications cloud deployment and the software stack data representative of the software stack of the telecommunications cloud deployment. In some examples, this can be performed in a similar manner as parse deployment critical data 1010 and execute validation rules 1012 of FIG. 10.

In some examples operation 1108 comprises determining that a first number of network addresses available to the telecommunications cloud deployment satisfies a second number of network addresses specified for a deployment type of the telecommunications cloud deployment.

In some examples, the second number of network addresses specified for the deployment type comprises the second number of network addresses having been specified for a single node type, a dual node type, or a multi-node type.

In some examples, operation 1108 comprises validating a range of network protocol addresses available to the telecommunications cloud deployment. In some examples, operation 1108 comprises validating a network subnet available to the telecommunications cloud deployment.

In some examples, operation 1108 comprises validating a storage device size available to the telecommunications cloud deployment. This can comprise determining that there is sufficient data storage space available in the hardware to meet the determined needs (or allocation) of the telecommunications cloud deployment.

In some examples, operation 1108 comprises validating a storage device requirement of a containerized application deployment of the telecommunications cloud deployment. This can comprise ensuring that there is enough data storage (e.g., on a storage drive) to hold a deployment of one or more containerized applications.

In some examples, operation 1108 comprises validating a first storage device specification applicable to a containerized application deployment of the telecommunications cloud deployment, and validating a second storage device specification applicable to a workload of the telecommunications cloud deployment. This can comprise ensuring that there is enough data storage (e.g., on a storage drive) to hold a deployment of one or more containerized applications, as well as data storage for a particular workload that can be executed with the containerized application(s).

In some examples, operation 1108 comprises validating a number of virtual local area networks available to the telecommunications cloud deployment.

After operation 1108, process flow 1100 moves to operation 1110.

Operation 1110 depicts, after validating the telecommunications cloud deployment, configuring the hardware to produce configured hardware. In some examples, this can be performed in a similar manner as configure hardware 1034 of FIG. 10.

After operation 1110, process flow 1100 moves to operation 1112.

Operation 1112 depicts performing at least one telecommunications operation using the configured hardware. This can comprise using a telecommunications deployment that that was deployed as part of implementing workflow 1000 of FIG. 10 to send and receive data.

After operation 1112, process flow 1100 moves to 1114, where process flow 1100 ends.

FIG. 12 illustrates an example process flow 1200 that can facilitate pro-active telecommunications infrastructure deployment failure detection, in accordance with an embodiment of this disclosure. In some examples, one or more embodiments of process flow 1200 can be implemented by pro-active telecommunications infrastructure deployment failure detection component 108 of FIG. 1, or computing environment 1400 of FIG. 141.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1100 of FIG. 11, and/or process flow 1300 of FIG. 13.

Process flow 1200 begins with 1202, and moves to operation 1204.

Operation 1204 depicts determining an inventory of hardware deployed in a telecommunications cloud deployment. In some examples, operation 1204 can be performed in a similar manner as operation 1104 of FIG. 11.

After operation 1204, process flow 1200 moves to operation 1206.

Operation 1206 depicts, after determining the inventory, determining a software stack of the telecommunications cloud deployment. In some examples, operation 1206 can be performed in a similar manner as operation 1106 of FIG. 11.

After operation 1206, process flow 1200 moves to operation 1208.

Operation 1208 depicts validating the telecommunications cloud deployment based on the software stack of the telecommunications cloud deployment. In some examples, operation 1208 can be performed in a similar manner as operation 1108 of FIG. 11.

In some examples, operation 1208 comprises, after determining the inventory, determining a type of the telecommunications cloud deployment, wherein the validating is performed based on the type of the telecommunications cloud deployment. This can be performed in a similar manner as operation 1108 of FIG. 11 as it applies to a cloud deployment type.

In some examples, operation 1208 comprises determining that the telecommunications cloud deployment stores data that satisfies a data storage criterion.

In some examples, operation 1208 comprises determining that the telecommunications cloud deployment has access to information that satisfies an information access criterion.

In some examples, operation 1208 comprises querying deployment critical data that corresponds to a cloud platform of the telecommunications cloud deployment, and validating the telecommunications cloud deployment based on the deployment critical data.

After operation 1208, process flow 1200 moves to operation 1210.

Operation 1210 depicts, after validating the telecommunications cloud deployment, configuring the hardware, resulting in configured hardware. In some examples, operation 1210 can be performed in a similar manner as operation 1110 of FIG. 11.

After operation 1210, process flow 1200 moves to 1212, where process flow 1200 ends.

FIG. 13 illustrates an example process flow 1300 that can facilitate pro-active telecommunications infrastructure deployment failure detection, in accordance with an embodiment of this disclosure. In some examples, one or more embodiments of process flow 1300 can be implemented by pro-active telecommunications infrastructure deployment failure detection component 108 of FIG. 1, or computing environment 1400 of FIG. 141.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1100 of FIG. 11, and/or process flow 1200 of FIG. 12.

Process flow 1300 begins with 1302, and moves to operation 1304.

Operation 1304 depicts determining an inventory of hardware deployed in a telecommunications cloud deployment. In some examples, operation 1304 can be performed in a similar manner as operation 1104 of FIG. 11.

After operation 1304, process flow 1300 moves to operation 1306.

Operation 1306 depicts, after determining the inventory, determining a group of computer-executable programs of the telecommunications cloud deployment that the telecommunications cloud deployment is configured to execute. In some examples, operation 1306 can be performed in a similar manner as operation 1106 of FIG. 11.

After operation 1306, process flow 1300 moves to operation 1308.

Operation 1308 depicts validating the telecommunications cloud deployment based on the group of computer-executable programs of the telecommunications cloud deployment. In some examples, operation 1308 can be performed in a similar manner as operation 1108 of FIG. 11.

In some examples, operation 1308 comprises, after determining the inventory, determining a type of the telecommunications cloud deployment, wherein the validating is performed based on the type of the telecommunications cloud deployment. This can be performed in a similar manner as operation 1108 of FIG. 11 as it applies to a cloud deployment type.

After operation 1308, process flow 1300 moves to operation 1310.

Operation 1310 depicts, after validating the telecommunications cloud deployment, configuring the hardware to produce configured hardware. In some examples, operation 1310 can be performed in a similar manner as operation 1110 of FIG. 11.

In some examples, operation 1310 comprises updating a firmware of the hardware. In some examples, this can be performed in a similar manner as firmware 1020 of FIG. 10.

In some examples, operation 1310 comprises configuring a baseboard management controller of the hardware. In some examples, this can be performed in a similar manner as BMC 1016 of FIG. 10.

In some examples, operation 1310 comprises configuring a basic input output system of the hardware. In some examples, this can be performed in a similar manner as BIOS 1018 of FIG. 10.

In some examples, operation 1310 comprises configuring a redundant array of inexpensive disks of the hardware. In some examples, this can be performed in a similar manner as RAID configuration 1022 of FIG. 10.

After operation 1310, process flow 1300 moves to operation 1312.

Operation 1312 depicts performing a telecommunications operation using the configured hardware. In some examples, operation 1312 can be performed in a similar manner as operation 1112 of FIG. 11.

After operation 1304, process flow 1300 moves to 1314, where process flow 1300 ends.

Example Operating Environment

In order to provide additional context for various embodiments described herein, FIG. 14 and the following discussion are intended to provide a brief, general description of a suitable computing environment 1400 in which the various embodiments of the embodiment described herein can be implemented.

For example, parts of computing environment 1400 can be used to implement one or more embodiments of computer 102, and/or telecommunications deployment 106.

In some examples, computing environment 1400 can implement one or more embodiments of the process flows of FIGS. 11-13 to facilitate pro-active telecommunications infrastructure deployment failure detection.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile storage such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
      determining inventory data representative of an inventory of hardware deployed in a telecommunications cloud deployment;
      after determining the inventory data,
         determining type data representative of a type of the telecommunications cloud deployment, and
         determining software stack data representative of a software stack of the telecommunications cloud deployment;
      validating the telecommunications cloud deployment based on the type data representative of the type of the telecommunications cloud deployment and the software stack data representative of the software stack of the telecommunications cloud deployment;
      after validating the telecommunications cloud deployment, configuring the inventory of hardware to produce a configured inventory of hardware; and
      performing at least one telecommunications operation using the configured inventory of hardware.

2. The system of claim 1, wherein the validating comprises:
   determining that a first number of network addresses available to the telecommunications cloud deployment satisfies a second number of network addresses specified for a deployment type of the telecommunications cloud deployment.

3. The system of claim 2, wherein the second number of network addresses specified for the deployment type comprises the second number of network addresses having been specified for a single node type, a dual node type, or a multi-node type.

4. The system of claim 1, wherein the validating comprises:
   validating a range of network protocol addresses available to the telecommunications cloud deployment.

5. The system of claim 1, wherein the validating comprises:
   validating a network subnet available to the telecommunications cloud deployment.

6. The system of claim 1, wherein the validating comprises:
   validating a storage device size available to the telecommunications cloud deployment.

7. The system of claim 1, wherein the validating comprises:
   validating a storage device requirement of a containerized application deployment of the telecommunications cloud deployment.

8. The system of claim 1, wherein the validating comprises:
   validating a first storage device specification applicable to a containerized application deployment of the telecommunications cloud deployment; and
   validating a second storage device specification applicable to a workload of the telecommunications cloud deployment.

9. The system of claim 1, wherein the validating comprises:
   validating a number of virtual local area networks available to the telecommunications cloud deployment.

10. A method, comprising:
   determining, by a system comprising at least one processor, an inventory of hardware deployed in a telecommunications cloud deployment;
   after determining the inventory, determining, by the system, a software stack of the telecommunications cloud deployment;
   validating, by the system, the telecommunications cloud deployment based on the software stack of the telecommunications cloud deployment;

after validating the telecommunications cloud deployment, configuring, by the system, the inventory of hardware, resulting in a configured inventory of hardware; and performing, by the system, telecommunications operations with the configured inventory of hardware.

11. The method of claim 10, further comprising:

after determining the inventory, determining, by the system, a type of the telecommunications cloud deployment, wherein the validating is performed based on the type of the telecommunications cloud deployment.

12. The method of claim 10, wherein the validating comprises:

determining that the telecommunications cloud deployment stores data that satisfies a data storage criterion.

13. The method of claim 10, wherein the validating comprises:

determining that the telecommunications cloud deployment has access to information that satisfies an information access criterion.

14. The method of claim 10, wherein the validating comprises:

querying deployment critical data that corresponds to a cloud platform of the telecommunications cloud deployment; and validating the telecommunications cloud deployment based on the deployment critical data.

15. The method of claim 10, wherein the operations further comprise:

after determining the inventory, determining a type of the telecommunications cloud deployment, wherein the validating is performed based on the type of the telecommunications cloud deployment.

16. A non-transitory computer-readable medium comprising instructions that, in response to execution, cause a system comprising at least one processor to perform operations, comprising:

determining an inventory of hardware deployed in a telecommunications cloud deployment;

after determining the inventory, determining a group of computer-executable programs of the telecommunications cloud deployment that the telecommunications cloud deployment is configured to execute;

validating the telecommunications cloud deployment based on the group of computer-executable programs of the telecommunications cloud deployment;

after validating the telecommunications cloud deployment, configuring the inventory of hardware to produce a configured inventory of hardware; and performing a telecommunications operation using the configured inventory of hardware.

17. The non-transitory computer-readable medium of claim 16, wherein configuring the inventory of hardware comprises:

updating a firmware of the inventory of hardware.

18. The non-transitory computer-readable medium of claim 16, wherein configuring the inventory of hardware comprises:

configuring a baseboard management controller of the inventory of hardware.

19. The non-transitory computer-readable medium of claim 16, wherein configuring the inventory of hardware comprises:

configuring a basic input output system of the inventory of hardware.

20. The non-transitory computer-readable medium of claim 16, wherein configuring the inventory of hardware comprises:

configuring a redundant array of inexpensive disks of the inventory of hardware.

* * * * *